United States Patent [19]

Labat

[11] Patent Number: 4,766,195

[45] Date of Patent: Aug. 23, 1988

[54] POLYMERS OF UNSATURATED ALCOHOL THIOETHERS

[75] Inventor: Yves Labat, Pau, France

[73] Assignee: Societe Nationale Elf Aquitaine, France

[21] Appl. No.: 942,966

[22] Filed: Dec. 15, 1986

Related U.S. Application Data

[63] Continuation of Ser. No. 779,490, Sep. 24, 1985, abandoned.

[30] Foreign Application Priority Data

Sep. 25, 1984 [FR] France .................. 84 14666

[51] Int. Cl.$^4$ .............................................. C08G 18/30
[52] U.S. Cl. .................... 528/76; 525/332.6; 525/350; 526/286; 526/289; 528/376
[58] Field of Search ............... 528/76, 376; 525/332.6, 525/350; 526/286, 289

[56] References Cited

U.S. PATENT DOCUMENTS 4,366,307 12/1982 Singh et al. ................. 528/373

Primary Examiner—Melvyn I. Marquis
Attorney, Agent, or Firm—Ostrolenk, Faber, Gerb & Soffen

[57] ABSTRACT

Polymer or copolymer having a chain carrying terminal and/or side-chain groups:

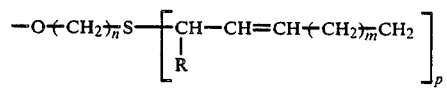

in which R is an H or a $C_2$ to $C_{12}$ alkyl, m is 0 to 6, n is 1 to 10 and p is 1 to 10, one, some or all of the p double bonds being saturatable by an active group.

4 Claims, No Drawings

POLYMERS OF UNSATURATED ALCOHOL THIOETHERS

This is a continuation of application Ser. No. 779,490 filed Sept. 24, 1985 and now abandoned.

The invention relates to a new type of unsaturated polymer and copolymer comprising at least 2 thioether functions at the end of the chain and/or side-chains; it comprises plasticizers, plastics masses and other products obtainable from these polymers. The process of preparation of the latter also forms part of the invention.

Unsaturated polymers are particularly interesting industrially; they comprise intermediate functionalizable compounds, due to their double bonds with which compounds can be reacted which have a reactive function vis-a-vis unsaturation, so leading to predetermined polymers; they can also be vulcanized at the position of the double bond. Unsaturated polymers having thioether units on their chain are of particular interest for the manufacture of polysulphides intended for the preparation of mastics, jointing compounds etc.

Numerous methods of preparation of unsaturated polymers are already known, in particular those which consist in polymerizing unsaturated compounds with themselves.

The preparation of unsaturated polymers or copolymers comprising at least two thioether units, according to the invention, consists in the condensation of an unsaturated alcohol-thioether with polymers or copolymers (called prepolymers in the text) having a chain which carries terminal functional groups or side-chain groups which are reactive with the alcohol function of the alcohol thioether.

The reaction of the unsaturated alcohol-thioether with the prepolymer generally takes place between 100° and 200° C., principally between 120° and 180° C., with the elimination of water, in the presence of a catalyst system known per se. This preparation can be carried out by the introduction of the novel unsaturated alcohol-thioethers according to the formula (3) into any polymeric chain already formed or in the course of formation, carrying terminal functional groups or side-chains which can react with unsaturated alcohols. This introduction can take place by dehydration in admixture with glycols (as described in U.S. Pat. No. 4,366,307 for 1-hydroxy-3-thia-nonene-8) or by combination with polymers previously formed, having as terminal functions the groups OH, isocyanate, acid, ester, aldehyde, acid chloride or others. The double bond remains free to fix compounds having a reactive function vis-a-vis unsaturation.

Among prepolymers capable of reacting with an unsaturated alcohol-polythioether and which constitute excellent starting materials for the preparation of polysulphides, those prepared from alcohol-thioethers particularly are known in industry. Thus polythioethers carrying terminal —OH groups have been prepared, by the condensation of thiodiglycol in the presence of an etherification catalyst, as described in U.S. Pat. Nos. 3,312,743 and 3,335,189. Other poly(alcohol-thioethers) have been produced by the copolymerization of thiodiglycol with diols, as disclosed in U.S. Pat. Nos. 3,005,803, 3,985,708 and 4,093,599. In the preparation of prepolymers utilizable for the preparation of polysulphides, a marked step forward has been accomplished by the use of a class of polythioether-alcohols having the advantage of being non-crystallizable liquids which are hardenable and resistant to water, solvents and heat. In these polymers, an —OH is located in the $\beta$ position to an —S— and the linear or branched chain unit is:

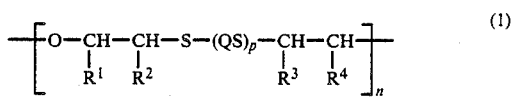

where Q is —CH$_2$CH$_2$CH$_2$CH$_2$—, —CH$_2$CH$_2$—, —CH$_2$CH$_2$SCH$_2$CH$_2$— or —CH$_2$CH$_2$OCH$_2$CH$_2$—, p being 0 or 1 and n 8 to 200. The groups R$^1$ to R$^4$ are H or lower alkyls: the total of their carbon atoms should be such that the polymer remains liquid, which imposes a choice guided by appropriate experimentation.

These prepolymers with OH terminal functions described in U.S. Pat. No. 4,366,307 are then condensed with compounds of the formula HO—CH$_2$—CH$_2$—S—R'—CH=CH$_2$, and particularly with 1-hydroxy-3-thia-nonene-8; the OH function condenses with the OH of the prepolymer and an unsaturated polymer is obtained which can be reacted with compounds having a function reactive vis-a-vis the double bond. But this compound is relatively expensive and produces alcohol-thioether polymers having only a single double bond at the ends of the chain; as the functionalization of these polymers is insufficient for the preparation of sufficiently cross-linked polysulphides, having the required properties, it is necessary to add triols, such as 1,5,13-trihydroxy-7-oza-3,11-dithiatridecane

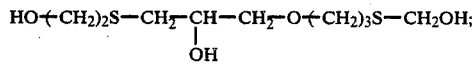

to the prepolymer(1). This compound, prepared by the reaction of mercaptoethanol with allyl-glycidyl ether, is an expensive compound which thus increases the cost of the prepolymer and does not introduce the so useful thioether functions into the polysulphides. Thus, the unsaturated thioether-alocohol polymers described in U.S. Pat. No. 4,366,307 have a certain number of disadvantages.

Prepolymers intended for the preparation of polysulphides and having diisocyanate terminal functions are described in U.S. Pat. No. 3,923,748. They are prepared by the reaction of polyglycols with an excess of diisocyanate. According to this patent, the unsaturation at the ends of the chain with which the mercaptans are to react is created by the addition of an unsaturated alcohol, such as allyl alcohol which does not include S.

The present invention brings to the state of the art mentioned above an improvement which has the advantage of a more economical preparation and the possibility of more rapidly obtaining harder plastics or elastomeric masses. The invention allows variation according to needs of the properties of the polymers, by simple modification of the molecular ratios during the course of the synthesis of the hydroxy-thia-alkenes used for their manufacture. A greater number of double bonds can thus be introduced into the unsaturated polymer.

The new unsaturated alcohol-thioether polymers according to the invention are characterized by terminal and/or side-chain groups:

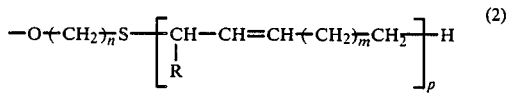 (2)

or by derivatives of such groups formed following fixation of a group to the double bond or bonds. In these groups, R is an H or an alkyl side-chain, the number of carbon atoms of which can vary, particularly from 1 to 12 but which, in general is from 1 to 6; m is 0 to 6, n is 1 to 10 and preferably 2 to 6, p being 1 to 10 and most often 1 to 3, in the case of the most accessible products.

In fact alcohol-thioethers having a double bond were previously known, as indicated in U.S. Pat. No. 4,366,307 mentioned above. But in these prior products, the double bond is found at the end of a thioether group chain, while in the polymers according to the invention at least one of the double bonds is β to the sulphur atom and there is no other double bond at the end of the chain. Also, the new polymers can have a number, p, of double bonds which modify the properties of the product and the derived products; it is the new unsaturated alcohol-thioethers which provide these advantages.

These unsaturated alcohol-thioethers can be prepared economically by the action of a mercapto-alcohol on a conjugated diolefin; the conjugated position of the two double bonds in the diene so used constitutes the interest of the invention. The compound employed for the preparation of the new polymers thus corresponds to the formula

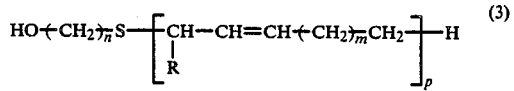 (3)

where R, m, n and p have the same meanings as given above in relation to formula (2).

By way of example, several unsaturated alcohol-thioethers are described below, which are particularly useful for carrying out the invention. They are compounds obtained by the reaction of mercapto-ethanol with butadiene:

HSCH$_2$CH$_2$OH + CH$_2$=CH—CH=CH$_2$.
→HOCH$_2$CH$_2$—S—CH$_2$—CH=CH—CH$_3$ (4)

1-hydroxy-3-thia-heptene-5(HTH).
This compound is designated below by the abbreviation "HTH"; it corresponds to the formula (3) in which n=2, R=H, m=0, p=1.

The second compound, which forms alongside the foregoing, particularly when the number of moles of butadiene exceeds 2 per 1 of mercapto-ethanol is:

HOCH$_2$CH$_2$S—CH$_2$—CH=CH—CH$_2$—CH$_2$—CH=CH—CH$_3$ (5)

1-hydroxy-3-thia-undecadiene-5,9 (HTU).
This results from the addition of 1 mole of butadiene to the foregoing compound HTH; n, R and m are the same as above, but p=2.

Another series of unsaturated alcohol-thioethers forms, particularly when there are more than 3 moles of butadiene per mole of mercapto-ethanol; these are products containing more than 2 double bonds, particularly:

HOCH$_2$CH$_2$S—CH$_2$—CH=CH—CH$_2$—CH$_2$—CH=CH—CH$_2$CH$_2$—CH=CH—CH$_3$ (6)

1-hydroxy-3-thia-pentadecatriene-5,9,13 (HTP).
This triene or its isomers form in increasing proportions when the butadiene/mercapto-ethanol ratio increases, particularly above 3. Here the coefficients n, m and R are the same as above, but p=3.

Isomers of the three compounds exist, but the structure of the above products largely predominates. Thus, there are, in particular, isomers with vinyl termination identified by NMR analysis such as:

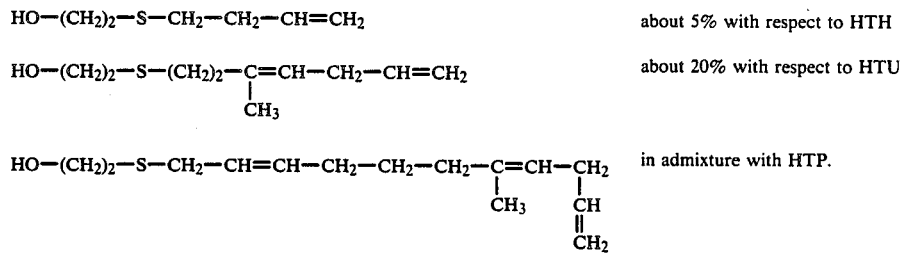

1-hydroxy-3-thia-10-methyl-tetradecatriene-5,10,13
HTH, HTU and HTP can be separated after distillation of mixtures with their isomers.

This variety of structure of the alcohol-thioethers allows useful variation of the properties of the polymers according to the invention which these products give rise to. For this, the diene/mercapto-alcohol molar ratio can be modified during preparation of the alcohol-thioethers or, if required, separation of the products obtained, as mentioned above; however, use of the crude products constitutes an interesting embodiment.

With dienes other than butadiene, the foregoing description is applicable in the same fashion, but naturally the number of possible isomers is greater. By way of example, the first compound, 1-hydroxy-3-thia-4-ethyl-nonene-5, is mentioned below,

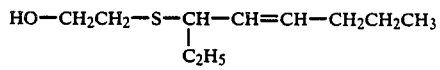

which is obtained from octadiene-3,5 and mercapto-ethanol; referring to formula 2, this represents n=2, R=C$_2$H$_5$, m=2, p=1.

The principal use of the unsaturated polymers and copolymers according to the invention is the preparation of elastomeric or plastics products and plasticizers for elastomers based on polymers of thio compounds.

The unsaturated polymers obtained can be directly vulcanized to elastomeric masses by peroxides or by radiation. Also, functional groups can be fixed to these unsaturated polymers by the reaction of compounds having a reactive function vis-a-vis unsaturation. This is the case for example with mercaptans, which allow saturated sulphur-containing products to be obtained, which are usable as plasticizers or as oil additives. The use of a mercaptan of the type $HS(CH_2)_3—Si(OR^1)_3$ (in which $R^1=$alkyl) allows polymers having a siloxane function to be obtained. This is also the case with the reaction of these unsaturated polymers with dithiols, permitting the formation of polymers with a mercaptan termination, particularly desired for cold cross-linking by standard oxidants, such as $MnO_2$, $PbO_2$ and others, in uses for jointing compounds and mastics, in particular in the building field and in double glazing.

Among dithiols which can be used to react with the unsaturated polymers, reference can be made to: $HS(CH_2)SH$; $HS(CH_2)_2SH$; $HS—CH_2S—CH_2SH$; $HS(CH_2)_2S(CH_2)_2SH$; $HS(CH_2)_2—O—(CH_2)_2SH$; $HS—(CH_2)_2—O—CH_2—O—(CH_2—_2SH$; $HS(CH_2)_4—O—CH_2—O—(CH_2)_4SH$; $HS(CH_2)_2—O—(CH_2)_2—O—(CH_2)_2SH$; without this list being limitative.

This type of polymer is described in U.S. Pat. No. 4,366,307; the polymeric chain constituted by units in which the sulphur is $\beta$ to the terminal OH function is condensed with 1-hydroxy-3-thia-nonene-8 or "HTN". As this alcohol-thioether has only a single double bond at the end of the chain, it is necessary to utilize, in the molecules composing the polymer of the patent cited, a trifunctional compound, 1,5,15-trihydroxy-7-oxa-3,11-dithiatridecane, (an allylglycidylether compound derived from the reaction of mercapto-ethanol and allylglycidyl ether), of increased functionality, to obtain products of acceptable hardness by cross-linking.

The advantage of the polymers and copolymers according to the invention obtained from the new unsaturated alcohol-thioethers is that they bring to compounds containing 2 or 3 double bonds the possibility of introducing a higher proportion of mercaptan for a given molecular weight and viscosity, thus allowing improved cross-linking properties to be obtained and rendering unnecessary the use of a trifunctional compound.

Polyfunctional polymers can thus be readily obtained. As described above, there are also various prepolymers having isocyanate functions, which are easily obtained by the reaction of glycols or triols of various molecular weights with diisocyanates (U.S. Pat. No. 3,923,748). The free isocyanate functions can react with unsaturated alcohol-thioethers to give polymers according to the invention having at least two unsaturations, capable of reaction with dithiols to allow the preparation of polymers with mercaptan functions which can then be vulcanized.

Other advantages of the unsaturated alcohol-thioethers are described at the beginning of this text: advantageous cost of production and practically quantitative yield of unsaturated products, even for compounds which contain a single double bond.

The invention is illustrated non-limitatively by the Examples which follow.

EXAMPLE 1

Preparation of Polymer with "HTH"

There are introduced into a 20-liter reactor, thermostated and agitated and capable of operating under vacuum:
thiodiglycol: 7770 g or 63.7 moles
hydroxyethylhydroxypropylsulphide: 3330 g or 24.5 moles
1,5,13-trihydroxy-7-oxa-3,11-dithia-tridecane: 540 g or 2 moles (HDT)
1-hydroxy-3-thia-heptene-5: 1320 g or 20 moles (HTH)
catalyst mixture: triphenylphosphite (140 g) and thiodiphenol (30 g).

The temperature is taken to 150° and then to 180° C. under a progressive vacuum allowing elimination of the water formed. The reaction is terminated when the hydroxyl index of the reaction mixture is below 7. 10270 g of product is obtained, which is taken with agitation to 80° C. and then 1140 g (7.46 moles) of dimercaptodiethyl-sulphide and 110 g of free radical catalyst, azobisisobutyronitrile, associated with a basic compound, tetramethylguanidine, 10 g, are introduced.

After reaction at 80° C., a liquid polymer is obtained, cross-linkable in the presence of the usual oxidation catalysts:

| Polymer | 56 parts |
|---|---|
| Phthalic ester plasticizer | 12 parts |
| $MnO_2$ | 10 parts |
| Carbon black | 10 parts |
| Balance | 12 parts |

The mass obtained has the following properties:

| Shore hardness | 50 |
|---|---|
| Rupture resistance: | $22 \times 10^5$ Pa |
| Elongation at rupture: | 250% |

EXAMPLE 2

Preparation of Polymer with "HTU"

Into a rotary 2-liter evaporator are introduced:
thiodiglycol: 805 g or 6.60 moles
hydroxythiaundecadiene (HTU): 93 g or 0.85 mole
then the catalyst system:
triphenylphosphite: 13 g
thiodiphenol: 3 g Operating under the conditions of the preceding Example, 1011 g of a product of hydroxyl index=6 are obtained. The unsaturated polymer is treated at 80° C. with 178.6 g (1.16 mole) of dimercaptodiethyl-sulphide in the presence of a free radical catalyst and the basic compound, tetramethylguanidine.

A polymer is obtained of viscosity 155 poise at 25° C. This polymer is introduced into the following composition.

| Polymer | 47 parts |
|---|---|
| Plasticizer | 15 parts |
| $MnO_2$ | 15 parts |
| Carbon black | 10 parts |
| Balance | 15 parts |

The following results are obtained after cross-linking:

| Shore hardness: | 52 |
|---|---|
| Rupture resistance: | $26 \times 10$ Pa |
| Elongation at rupture: | 250% |

It will be noted that this polymer has been synthesized without using a trifunctional compound (HDT).

EXAMPLE 3

Mixture of "HTH"+"HTU"

Into a 2-liter evaporator are introduced:
thiodyglycol: 777 g or 6.37 mole
hydroxyethylhydroxypropyl-sulphide: 333 g or 2.45 mole
a mixture of HTH+HTU=141 g or 0.551 mole of HTH and 0.366 mole of HTU
1,5,13-trihydroxy-7-oxa-3,11-dithia-tridecane: 41 g (0.151 mole)
catalytic mixture of 13.5 g of triphenylphosphite and thiodiphenol (3 g).

The mixture is taken to 150° to 180° C. under a progressive vacuum and 1014 g of an unsaturated liquid polymer is obtained, hydroxyl index=5.

The unsaturated polymer is then reacted at 80° C. with a dithiol, 120 g of dimercaptodiethyl-sulphide (0.78 mole), in the presence of a free radical catalyst. A polymer with mercaptan termination is obtained having a viscosity at 25° C. of 300 poise, which by cross-linking gives an elastomeric polymer of shore hardness 51.

EXAMPLE 4

Into a thermostated 20-liter reactor are introduced:
thiodiglycol: 614 g
hydroxyethylhydroxypropyl-sulphide: 260 g
1-hydroxy-3-thia-pentadecatriene-5,9,13 "HTP": 120 g
then the catalyst system: triphenylphosphite (11 g) and thiodiophenol (2 g).

The temperature is taken to 150° to 180° C. under a progressive vacuum allowing elimination of the water formed. At the end of the reaction, a hydroxyl index of 4 is obtained. 786 g of polymer is recovered.

The unsaturated polymer obtained is treated at 80° C. with 1.26 mole of mercaptoethyl-sulphide. A polymer having an SH content of 4% and a viscosity of 800 poise is obtained. This polymer formulated with $MnO_2$ as an oxidation catalyst gives an elastomeric polymer of Shore hardness 48.

EXAMPLE 5

Into a 20-liter reactor are introduced 10,165 g (1752 mole) of polyoxypropylene-triol of molecular weight 5800 and 915 g (5256 moles) of toluene-diisocyanate. The reactor is taken to 80° C. and the reaction is allowed to proceed, which gives a prepolymer having a residual NCO content of 1.96%. 742 g (4.9 moles) of unsaturated alcohols, corresponding to the reaction mixture of the mercaptoethanol/butadiene adduct, principally the product according to formula (4), are added to the reactor. To the unsaturated polymer obtained, 1206 g (7.1 moles) of 1,8-dimercapto-3,5-dioxa-octane is added and this is allowed to react at 60° C. in the presence of a free radical catalyst. A polymer with mercaptan functions is obtained, which has a viscosity of 800 poise at 25° C. By cross-linking by means of mineral oxides, an elastomeric mass of Shore hardness 40 is obtained.

EXAMPLES 6 TO 9

The preparation according to Example 4 is repeated, but each time the "HTP" is replaced by the same number of moles of "HTH", "HTU" or "HTN". These hydroxy-thia-alkenes were distilled before use. In the polymers obtained, the residual oxhydriles were eliminated by treatment with toluene-diisocyanate, except in Example 8. Hardening was effected in 24 hours at 25° C. with the proportions in weight % of $MnO_2$ indicated in the results table below.

| Example No | RESULTS | | | |
|---|---|---|---|---|
| | 6 | 7 | 8 | 9 |
| Unsaturated thioether-alcohol | HTH | HTU | HTU | HTN |
| Molecular weight | 4000 | 6000 | 4000 | 3000 |
| Viscosity in poises | 780 | 370 | 150 | 390 |
| $MnO_2$ % | 42 | 40 | 49 | 42 |
| Shore hardness of the hardened mass | 30 | 39 | 42 | 22 |

It can be confirmed that hardening of the polymers containing units according to the invention, HTH or HTU, takes place better than if these units are replaced by HTN of the prior art (U.S. Pat. No. 4,366,307, Example 1).

I claim:

1. A polymeric reaction product of a polymer which carries a terminal or side chain group reactive with the hydroxyl group of an unsaturated alcohol thioether and an alcohol thioether of the formula

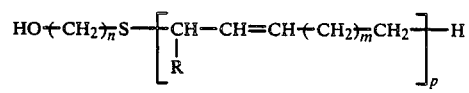

said reaction product having a terminal or side chain group of the formula

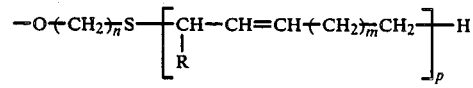

which R is hydrogen or a 1 to 12 carbon atom alkyl group, m is 0 to 6, n is 1 to 10, p is 1 to 10, wherein said reaction product is cross-linkable.

2. Product according to claim 1, characterised in that R is H or a $C_1$ to $C_6$ alkyl, n is 2 to 6, and p is 1 to 3.

3. Product according to claim 1 which is the reaction product of thiodiglycol, hydroxyethylhydroxypropyl-sulfide and unsaturated alcohol-thioether selected from the group consisting of 1-hydroxy-3-thia-heptene-5, 1-hydroxy-3-thia-undecadiene-5,9, 1-hydroxy-3-thia-pentadecadiene-5,9,13, and a combination thereof.

4. Product according to claim 1, characterised in that said unsaturated alcohol-thioether is 1-hydroxy-3-thia-heptene-6, 1-hydroxy-3-thia-3-methyl-decadiene-6,9, 1-hydroxy-3-thia-10-methyl-tetradecadiene-5,10,13 or a combination thereof.

* * * * *